US012165795B2

(12) United States Patent
Girlanda et al.

(10) Patent No.: US 12,165,795 B2
(45) Date of Patent: Dec. 10, 2024

(54) SUPPORT STRUCTURE FOR AT LEAST ONE WINDING OF A POWER TRANSFORMER, POWER TRANSFORMER AND METHOD FOR MANUFACTURING

(71) Applicant: HITACHI ENERGY LTD, Zürich (CH)

(72) Inventors: Orlando Girlanda, Västerås (SE); Grzegorz Kmita, Giebultow (PL); Michal Kozupa, Cracow (PL); Rongsheng Liu, Västerås (SE); Tomasz Nowak, Cracow (PL); Robert Sekula, Cracow (PL)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/561,037

(22) PCT Filed: Apr. 1, 2022

(86) PCT No.: PCT/EP2022/058765
§ 371 (c)(1),
(2) Date: Nov. 15, 2023

(87) PCT Pub. No.: WO2022/242949
PCT Pub. Date: Nov. 24, 2022

(65) Prior Publication Data
US 2024/0258011 A1    Aug. 1, 2024

(30) Foreign Application Priority Data

May 18, 2021   (EP) .................................. 21174288

(51) Int. Cl.
*H01F 27/08* (2006.01)
*H01F 27/06* (2006.01)
(Continued)

(52) U.S. Cl.
CPC ............. *H01F 27/06* (2013.01); *H01F 27/10* (2013.01); *H01F 27/26* (2013.01); *H01F 27/324* (2013.01); *H01F 41/02* (2013.01)

(58) Field of Classification Search
CPC ....................................................... H01F 27/06
(Continued)

(56) References Cited

U.S. PATENT DOCUMENTS 2,442,274 A * 5/1948 Mallett ................. H01F 27/324
336/84 R
2,632,041 A * 3/1953 Bilodeau ............... H01F 27/306
336/185

(Continued)

FOREIGN PATENT DOCUMENTS

CA         3115403 A1    4/2021
CN      101840765 A      9/2010
(Continued)

OTHER PUBLICATIONS

International Preliminary Report on Patentability, International Application No. PCT/EP2022/058765, mailed Apr. 14, 2023, 16 pages.
(Continued)

*Primary Examiner* — Ronald Hinson
(74) *Attorney, Agent, or Firm* — Sage Patent Group

(57) ABSTRACT

The present disclosure relates to a support structure for at least one winding of an inductive device, in particular a power transformer, comprising a press structure configured to transfer and distribute an compression force from a holding structure to the at least one winding, an insulator structure configured to electrically insulate the holding structure from the at least one winding, and a coolant flow structure configured to guide and distribute a flow of a liquid coolant to or from different parts of the at least one winding. The press structure, the insulator structure and the coolant
(Continued)

flow structure are formed as one integrated part comprising a polymer material. The integrated part comprises a plurality of orifices for passage of the liquid coolant from a first side facing the holding structure to a second side facing the at least one winding.

15 Claims, 4 Drawing Sheets

(51) Int. Cl.
H01F 27/10 (2006.01)
H01F 27/26 (2006.01)
H01F 27/32 (2006.01)
H01F 41/02 (2006.01)

(58) Field of Classification Search
USPC .......................................................... 336/60
See application file for complete search history.

(56) References Cited

U.S. PATENT DOCUMENTS

| | | | | |
|---|---|---|---|---|
| 3,302,149 A * | 1/1967 | Forsha | ................. | H01F 27/322 336/60 |
| 3,663,910 A * | 5/1972 | Grubb | ..................... | H01F 27/12 336/60 |
| 3,684,991 A * | 8/1972 | Trump | ................... | H01F 30/12 336/84 R |
| 4,011,535 A * | 3/1977 | Kosky | ..................... | H01F 27/18 174/15.1 |
| 4,308,512 A | 12/1981 | Capecchiacci et al. | | |
| 4,663,604 A * | 5/1987 | VanSchaick | .......... | H01F 27/306 336/62 |
| 6,806,803 B2 * | 10/2004 | Hopkinson | ............. | H01F 30/12 336/12 |
| 7,890,233 B2 * | 2/2011 | Yamada | .............. | G06F 11/1679 701/43 |
| 11,017,938 B2 * | 5/2021 | Navarro | .................. | H01F 30/12 |
| 2007/0247266 A1 * | 10/2007 | Yargole | ................. | H01F 27/085 336/61 |
| 2010/0237971 A1 | 9/2010 | Ikezawa | | |
| 2011/0037550 A1 | 2/2011 | Golner et al. | | |
| 2014/0075744 A1 * | 3/2014 | Anger | ................... | H01F 27/002 29/729 |

FOREIGN PATENT DOCUMENTS

| | | |
|---|---|---|
| CN | 105229758 A | 1/2016 |
| CN | 110832744 A | 2/2020 |
| WO | 2014095399 A1 | 6/2014 |

OTHER PUBLICATIONS

International Search Report and Written Opinion of the International Searching Authority, International Application No. PCT/EP2022/058765, mailed Jul. 19, 2022, 9 pages.
First Office Action for Chinese Invention Patent Application No. 2022800361657, mailed Mar. 16, 2024, 5 pages.

* cited by examiner

SUPPORT STRUCTURE FOR AT LEAST ONE WINDING OF A POWER TRANSFORMER, POWER TRANSFORMER AND METHOD FOR MANUFACTURING

CROSS REFERENCE TO RELATED CASES

This application is a 35 U.S.C. § 371 national stage application of PCT International Application No. PCT/EP2022/058765 filed on Apr. 1, 2022, which in turn claims priority to European Patent Application No. 21174288.7, filed on May 18, 2021, the disclosures and content of which are incorporated by reference herein in their entireties.

TECHNICAL FIELD

The present disclosure relates to a support structure for at least one winding of an inductive device, in particular a power transformer, comprising a press structure, an insulator structure and a coolant flow structure. The present disclosure further relates to a power transformer comprising such a support structure and a method for manufacturing the same.

BACKGROUND

Document WO 2014/095399 A1 relates to an electrical transformer comprising an electrical insulator and a winding of an electrical conductor around a core, said insulator being formed of an essentially non-porous composite material.

SUMMARY

Embodiments of the disclosure relate to improved support structures for at least one winding of an inductive device, in particular a power transformer, which combine and optimize various functions of the support structure. In particular, the number of parts required or their respective dimensions shall be reduced with regard to conventional support structures formed from cellulose based materials such as laminated wood or laminated press board.

According to a first aspect, a support structure for at least one winding of an inductive device, in particular a power transformer, is provided. The support structure comprises a press structure configured to transfer and distribute a compression force from a holding structure to the at least one winding, an insulator structure configured to electrically insulate the holding structure from the at least one winding, and a coolant flow structure configured to guide and distribute a flow of a liquid coolant to or from different parts of the at least one winding. The press structure, the insulator structure and the coolant flow structure are formed as one integrated part comprising a polymer material. The integrated part comprises a plurality of orifices for passage of the liquid coolant from a first side facing the holding structure to a second side facing the at least one winding.

The use of one integrated part, e.g. a single part formed in a single process, such as an additive manufacturing process, and/or as a single block, i.e. a mono-block, from a polymer material results in a faster, simpler manufacturing process and a more robust support structure as compared to multi-part support structures, which combine several parts manufactured individually and then joined together, for example by gluing or the like.

The use of suitable polymer materials, such as engineering plastic materials or photo-curable resins, i.e. commercially available (photo-)polymer materials having a sufficient hardness and durability to provide mechanical stability results in a support structure with improved properties, such improved electrical, mechanical and/or chemical properties. For example, the support structure may have a lower dielectric permittivity, a more isotropic or uniform structure, a higher resilience to mechanical forces, and a higher resistance against chemical substances contained in a liquid coolant especially at an elevated temperature during operation of a power transformer, as compared to conventional, cellulose based materials. Consequently, such polymer materials can be potentially used as insulation with a higher thermal class.

The use of polymer materials also enables the use of modern production methods, such as additive manufacturing, which allows for improved control of properties and shapes obtained thanks to multi-parameter optimization. At the same time, this helps to achieve lighter, less bulky support structures compared to conventional support structures, such as multi-part pressing arrangements with press plates made of cellulose based materials.

According to a second aspect, a power transformer is disclosed. The power transformer comprises a yoke, at least one transformer leg, each transformer leg comprising a core and at least one winding wound around the core, and at least one press plate arranged between the yoke and the at least one winding of the at least one transformer leg. The at least one press plate comprises a support structure according to the first aspect.

The above described support structure is useful for the design of particularly compact power transformers. In particular, by using an optimized, relatively thin support structure as press plate of a power transformer, the total height of the power transformer can be reduced for a given voltage or power class.

According to a third aspect, a method for manufacturing a support structure for at least one winding of an inductive device, in particular a power transformer, is provided. The support structure comprises an integrated press structure, an integrated insulator structure, an integrated coolant flow structure and a plurality of integrated orifices for passage of a liquid coolant from a first side of the support structure, facing a holding structure, to a second side of the support structure, facing the at least one winding. The method comprises the step of forming the support structure from a polymer material using additive manufacturing.

Such a method can be used, for example, to manufacture the support structure according to the first aspect, which in turn may be used to assemble a power transformer according to the second aspect.

As detailed above, the present disclosure comprises several aspects of a support structure, its manufacturing and its use. Every feature described with respect to one of the aspects is also disclosed herein with respect to the other aspects, even if the respective feature is not explicitly mentioned in the context of the specific aspect.

BRIEF DESCRIPTION OF THE DRAWINGS

The accompanying figures are included to provide a better understanding. In the figures, elements of the same structure and/or functionality may be referenced by the same reference signs. It is to be understood that the embodiments shown in the figures are illustrative representations and are not necessarily drawn to scale.

DETAILED DESCRIPTION

Before various embodiments of the present disclosure are described in more detail below, at first a conventional support arrangement for multiple windings of an inductive device is described as reference to FIG. 6.

Figure 6:
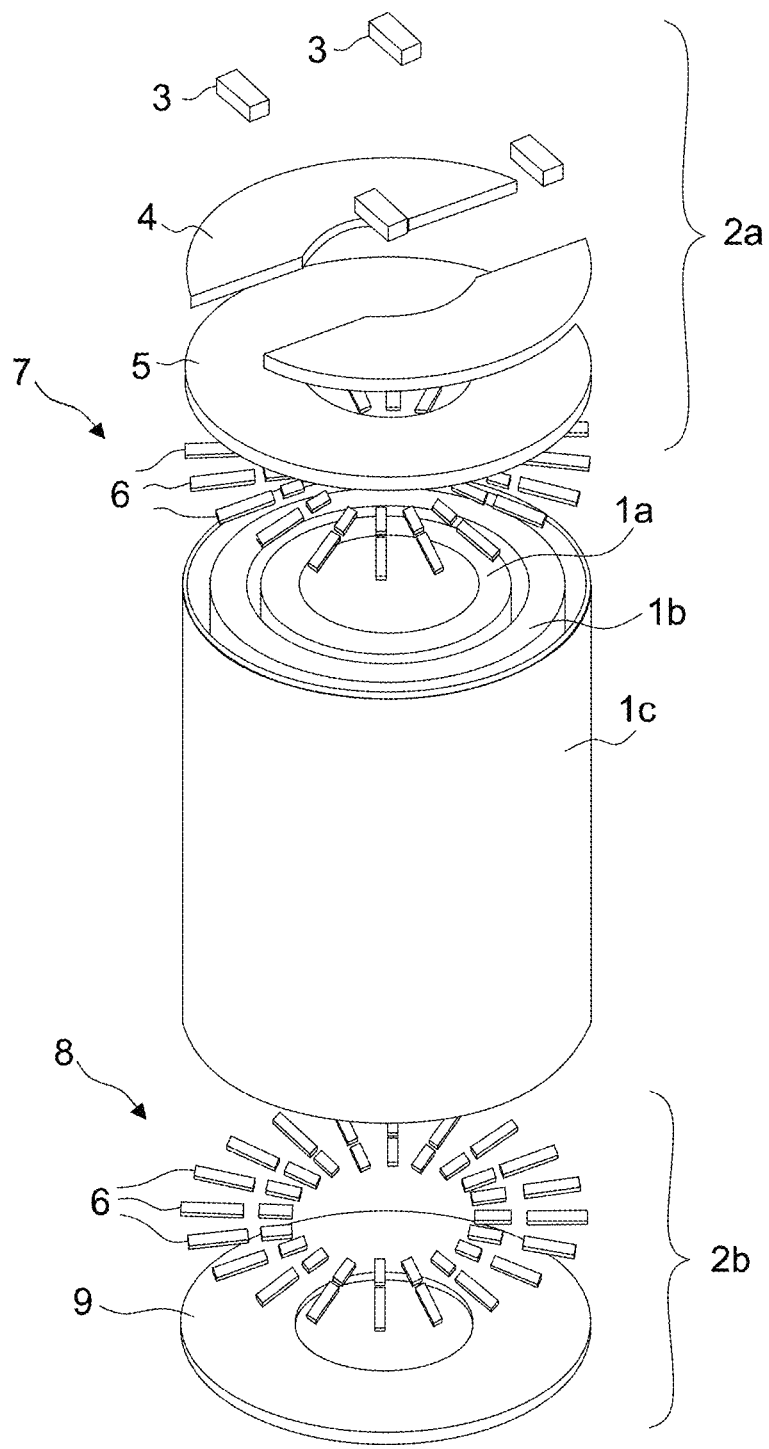
FIG. 6 is a schematic exploded view of a conventional support arrangement.

In the exploded view of FIG. 6, a total of three separate windings, an inner, low voltage winding 1a, a middle, high voltage winding 1b and an outer, regulation winding 1c, are wound around a common core (not shown in FIG. 6). The individual loops of each winding as well as the respective windings 1a to 1c in their entirety are insulated from one another using appropriate insulation materials. For example, a paper or net, enamel coating may be provided on a surface of each wire forming the loops of the windings 1a to 1c. Alternatively or in addition, pressboard spacers may be provided between individual turns of the windings 1a to 1c or between the individual windings 1a to 1c.

To keep the individual windings 1a to 1c in a place during transportation and operation of the inductive device, opposite ends of the windings 1a to 1c are pressed together using a compression force applied by means of a top support structure 2a and a bottom support structure 2b. In the arrangement shown in FIG. 6, each one of the support structures 2a and 2b is formed from separate parts made from a cellulose based material. For example, the top support structure 2a comprises four press blocks 3, two press supports 4, a top press ring 5 and a plurality of spacers 6 forming a top spacer ring 7. The bottom support structure 2b also comprises a plurality of spacers 6 forming a bottom spacer ring 8 and a bottom press ring 9.

The various parts of the support structures 2a and 2b are optimized individually to perform various functions as described below. For example, the press blocks 3 are made from laminated pressboard or laminated wood and are configured to transfer a compressive load, which is applied to them from above, to the below supports 4 to keep the windings 1a to 1c in place. The two press supports 4 are configured as semicircular parts and are made from laminated pressboard or laminated wood. They help to reduce a deflection of the top support structure 2a. The top press ring 5 is also made from laminated pressboard or laminated wood and distributes the compression force to different parts of the upper end of the windings 1a to 1c. The top spacer ring 7 formed by individual spacers 6 of laminated pressboard. Between the individual spacers 6, channels are formed to let a coolant flow out of the windings 1a to 1c. The bottom spacer ring 8 is configured in a similar way as the top spacer ring 7 and allows oil used for cooling to flow into the windings 1a to 1c. Equally, the bottom press ring 9 is made from laminated pressboard and collects the compressing force applied to the windings 1a to 1c by the upper support structure 2a.

While the above arrangement provides the required functions of holding, insulating and cooling the windings 1a to 1c of an inductive device, it is relatively complex in its design and therefore costly to manufacture. Moreover, the used materials, i.e. pressboard and/or laminated wood, are relatively heavy, have a relatively high dielectric permittivity of 4.0 to 4.4, and have anisotropic mechanical properties. To compensate for these facts, the individual parts forming the support structures 2a and 2b are often over-designed resulting in a relatively high thickness of the top support structure 2a and the bottom support structure 2b. Accordingly, there is a desire to further improve support structures, which can be used for supporting at least one winding of an inductive device, such as power transformer or reactor.

Figure 1:
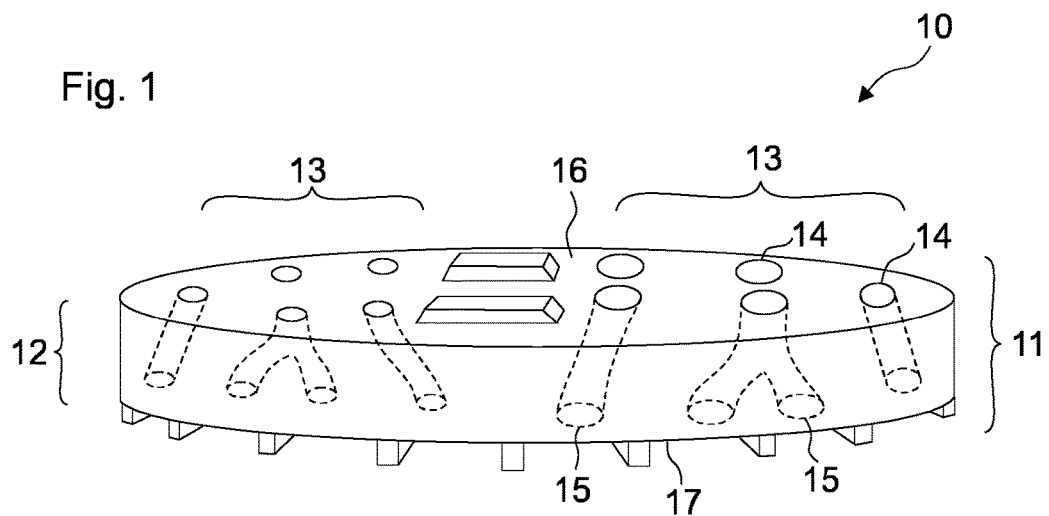
FIG. 1 is a schematic perspective view of a support structure.

FIG. 1 shows an improved support structure 10 according to an embodiment of the present disclosure. The exemplary support structure 10 comprises a press structure 11, an insulator structure 12 and a coolant flow structure 13. Contrary to the support structures 2a and 2b of FIG. 6, the support structure 10 of FIG. 1 is formed as one integrated part made from a polymer material, in particular an engineering plastic material. In the described embodiment, the support structure 10 is 3D printed, or produced by a similar, additive manufacturing technology.

In the exemplary embodiment, the used polymer material is isotropic and transfers mechanical loads uniformly based on the structural arrangements obtained in the optimization steps. Such properties allow the manufacturing of a relatively lightweight, potentially support structure 10 with one or more internal cavities. Such a support structure 10 can exert and maintain a required compression of forces for a long period of time, e.g. throughout an expected life cycle of several years or decades but also is capable to safely transfer compression and bending forces from the at least one winding to the at least one holding structure, e.g. during a short-circuit of a power transformer comprising the support structure.

According to at least one embodiment, the polymer material comprises at least one of polyetherimide (PEI) or polyether ether ketone (PEEK) or polyamide (PA) or polyphenylene sulfide (PPS) or polybutylene terephthalate (PBT) or polycyclohexylenedimethylene terephthalate (PCT). Alternatively or in addition, the polymer material may comprise a composite material comprising fibers or any other reinforcing phase surrounded by a synthetic thermoplastic compound. For example glass fibers may be surrounded by polyetherimide (PEI) or polyether ether ketone (PEEK) or polyamide (PA) or polyphenylene sulfide (PPS) or polybutylene terephthalate (PBT) or polycyclohexylenedimethylene terephthalate (PCT). Such materials can be used in additive manufacturing processes and therefore enable rapid and cost effective manufacturing of optimized support structures for power transformers, which are often only manufactured in relatively low numbers.

In the depicted embodiment, the press structure 11 comprises a relatively flat, ring or disk shaped body with several protrusions on its upper and lower main surface. The use of modern production methods allows the integrated formation of protrusions on a body, thus eliminating the need to provide separate parts, such as press blocks 3, press supports 4, or spacers 6. Together, these elements of the support structure 10 enable to transmit and distribute a compression force from a holding structure to at least one winding arranged below the support structure 10 (not shown in FIG. 1). The insulator structure 12 is essentially formed by the plastic material of the body of the support structure 10.

In the depicted example, the support structure 10 is formed from a polymer material having a relatively low intrinsic dielectric permittivity of less than 6.5, for example less than 4.0 or less than 3.5. In operation, i.e. when cooling channels and/or other cavities of the support structure 10 are filled with a liquid coolant, in particular a mineral oil as used for cooling power transformers, the effective or combined dielectric permittivity of the support structure and the coolant will be even lower. For example, for mineral oil having a dielectric permittivity of about 2.1, the effective dielectric permittivity of the support structure 10 will be less than 3.5 or even less than 3.0. Compared to the corresponding press rings 5 and 9 made from laminated pressboard, the insulator structure 12 can be made a thinner and still provides sufficient electrical insulation between any holding structure arranged over the support structure 10 and the at least one winding arranged below.

In the depicted example, the coolant flow structure 13 comprises a number of orifices 14 and 15 arranged on a first side 16 and a second side 17 of the support structure 10, respectively. The first side 16 corresponds to the side of the support structure 10 facing a holding structure, such as a yoke of a power transformer. The second side 17 corresponds to the lower side of the support structure 10 facing the at least one winding. The orifices 14 and 15 are interconnected and configured, so that the liquid coolant can flow from the second side 17 to the first side 16 during operation of an inductive device comprising the support structure 10, or vice versa. Moreover, in the embodiment shown in FIG. 1, the protrusions at the second side 17 may also help to guide or channel the coolant to or from corresponding parts of at least one winding.

Figure 2:
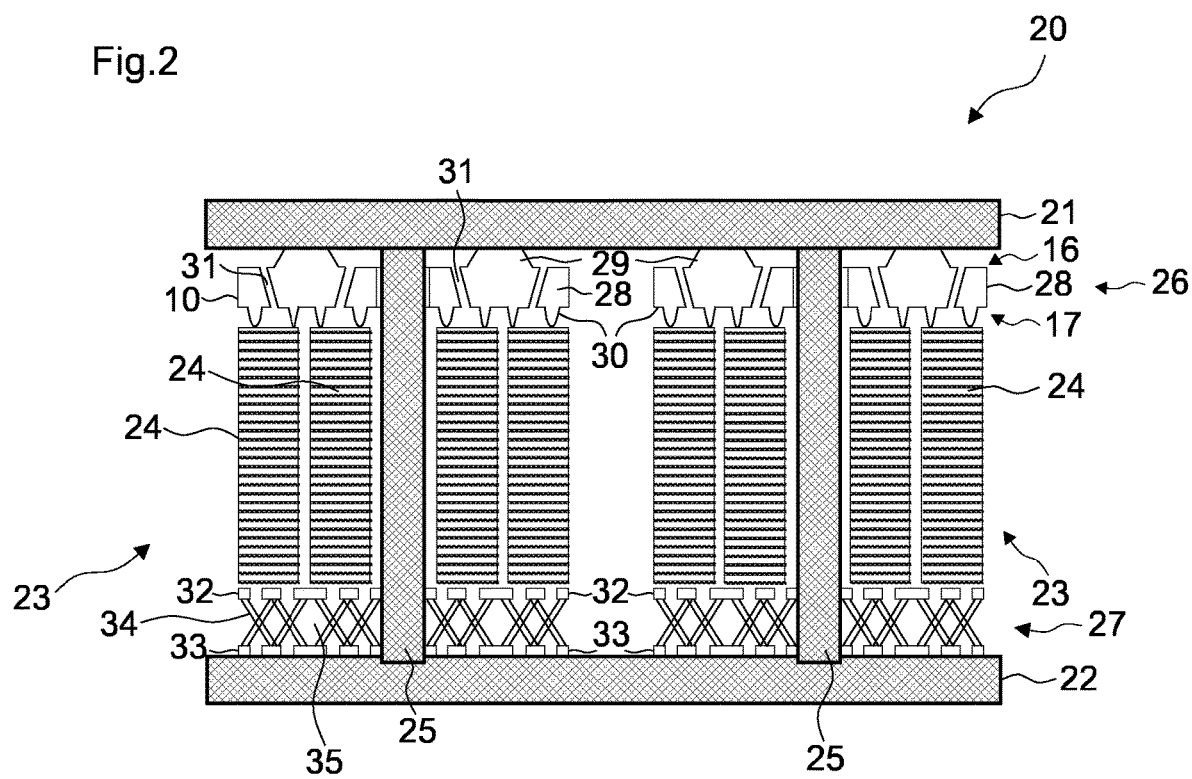
FIG. 2 is a schematic cross-sectional view of a power transformer.

According to at least one embodiment, at least one curved cooling channel interconnects at least one first orifice 14 located at the first side 16 with at least one second orifice 15 located at the second side 17. Use of modern production methods, such as additive manufacturing, allows for the provision of curved cooling channels, which in turn allow a flow of a liquid coolant to be directed to different parts of the at least one winding without creating turbulences or other undesirable disturbances in the flow of the coolant. FIG. 2 shows a cross section through a power transformer 20 according to an embodiment of the present disclosure. The power transformer 20 comprises an upper yoke 21, a lower yoke 22 and two transformer legs 23 arranged between the yokes 21 and 22. Although for the sake of simplicity only two transformer legs 23 are shown in FIG. 2, attention is drawn to the fact that power transformers often comprise three or more transformer legs. In particular, in a three-phase power distribution network, typically power transformers with three transformer legs 23 will be used.

Each transformer leg 23 comprises one or more windings 24 wound around a common core 25. In the described embodiment, two windings 24, for example a low voltage winding and a high voltage winding, are wound around each core 25 of each transformer leg 23. The windings 24 are held in place by an upper press plate 26 and a lower press plate 27. As can be seen in FIG. 2, the press plates 26 and 27 are arranged between an upper end of the windings 24 and the upper yoke 21, and the lower end of the windings 24 and the lower yoke 22, respectively. That is to say, the press plates 26 and 27 transfer a mechanical compression force from the transformer yoke to the windings 24.

Although not shown in FIG. 2, at least the lower yoke 22 and two transformer legs 23, including the coils 24 and the press plates 26 and 27, and, optionally, the upper yoke 21 are arranged within a common tank holding a liquid cooling, which holds a liquid coolant, such as mineral oil, silicon oil, synthetic ester, or natural ester. In operation of the power transformer, the liquid coolant circulates through the coils 24.

In the described embodiment, the upper press plate 26 is configured in a similar way as the support structure as shown in FIG. 1. In particular, it comprises an essentially flat, in the presented example disk shaped body 28, with a number of first protrusions 29 arranged on a first side 16 of the upper press plate 26 corresponding to a first main surface of the body 28, and a number of second protrusions 30 arranged on a second side 17 of the upper press plate 26 corresponding to a first main surface of the body 28. Moreover, the disk shaped body 28 comprises a number of internal cooling channels 31 which allow a liquid coolant to flow in or out of the windings 24 when the power transformer 20 is immersed in a cooling fluid. The cooling channels 31 of FIG. 2 are straight and cross the disk shaped body 28 at an angle with respect to a longitudinal axis of the essentially cylindrical windings 24 corresponding to the longitudinal axis of the core 25. Alternatively, as shown in FIG. 1, the cooling channels 31 may be curved and end at the first surface 16 and/or the second surface at right angles. Moreover, any combination is possible, e.g. curved cooling channels ending at an angle, or straight cooling channels ending at right angles of the surfaces 16 and 17 and/or in parallel to a longitudinal axis of the coils 24.

In general, the lower press plate 27 may have the same shape and configuration as the upper press plate 26. However, in the described example, the lower press plate 27 is configured in a different manner. As shown, it comprises an upper cover 32 and a lower cover 33, which are spaced apart by a number of struts 34 together forming a cell or truss structure. Orifices 14 and 15 are arranged in the upper and lower covers 32 and 33, respectively, so that the cooling fluid may enter or leave individual open cells 35 of the cell or truss structure from below, above or the sides. Although not shown in FIG. 2, the lower press plate 27 may also comprise a cylindrical outer cover, with or without further orifices formed therein.

In the described embodiment, both the upper press plate 26 and the lower press plate 27 are formed using additive manufacturing or a similar modern manufacturing methods from a polymer material with an intrinsic relative dielectric permittivity of 3.0 to 4.0. The used engineering plastic material also has a number of favorable mechanical properties, which results in a reduction of the winding-to-yoke distance. This in turn leads to a reduction in the overall dimensions of the power transformer 20. Moreover, use of additive rather than subtractive manufacturing results in a significant reduction of the amount material required. In addition, tooling and/or assembly costs can be reduced with respect to manufacturing and assembling low volumes of specialized individual parts, which helps to lower the overall manufacturing costs of the power transformer 20, despite a potential higher price of the raw material. The reduction in the size of the transformer 20, including the size of the magnetic core, will also result in a reduction in no-load losses as a desirable side effect.

Compared to plastic parts manufactured using conventional production methods, such as injection molding, the freedom obtained by additive manufacturing technology further allows the properties of the press plates 26 and 27 to be further optimized. Structures which can be manufactured by additive manufacturing methods, such as the upper press plate 26 with internal cooling channel 31 or the lower press plate 27 with an internal, open cell structure, provide adequate mechanical stiffness due to their optimized shape and internal structure, and improved thermal cooling due to the built-in cooling channels 31 or open cells 35. Moreover, thermoplastic materials used for additive manufacturing, such as PEI or PEEK, are resistant to relevant coolants, such as mineral oil, silicon oil, synthetic ester, or natural ester, and provide stable long term properties as desirable side effects resulting in lower tightening pressure over time. In addition, as detailed below, additive manufacturing will provide an improved design freedom to implement optimized shapes resulting from multi-physical optimization, i.e. the combined optimization of the support structure with regard to mechanical, thermal and electrical properties as desired.

Figure 3:
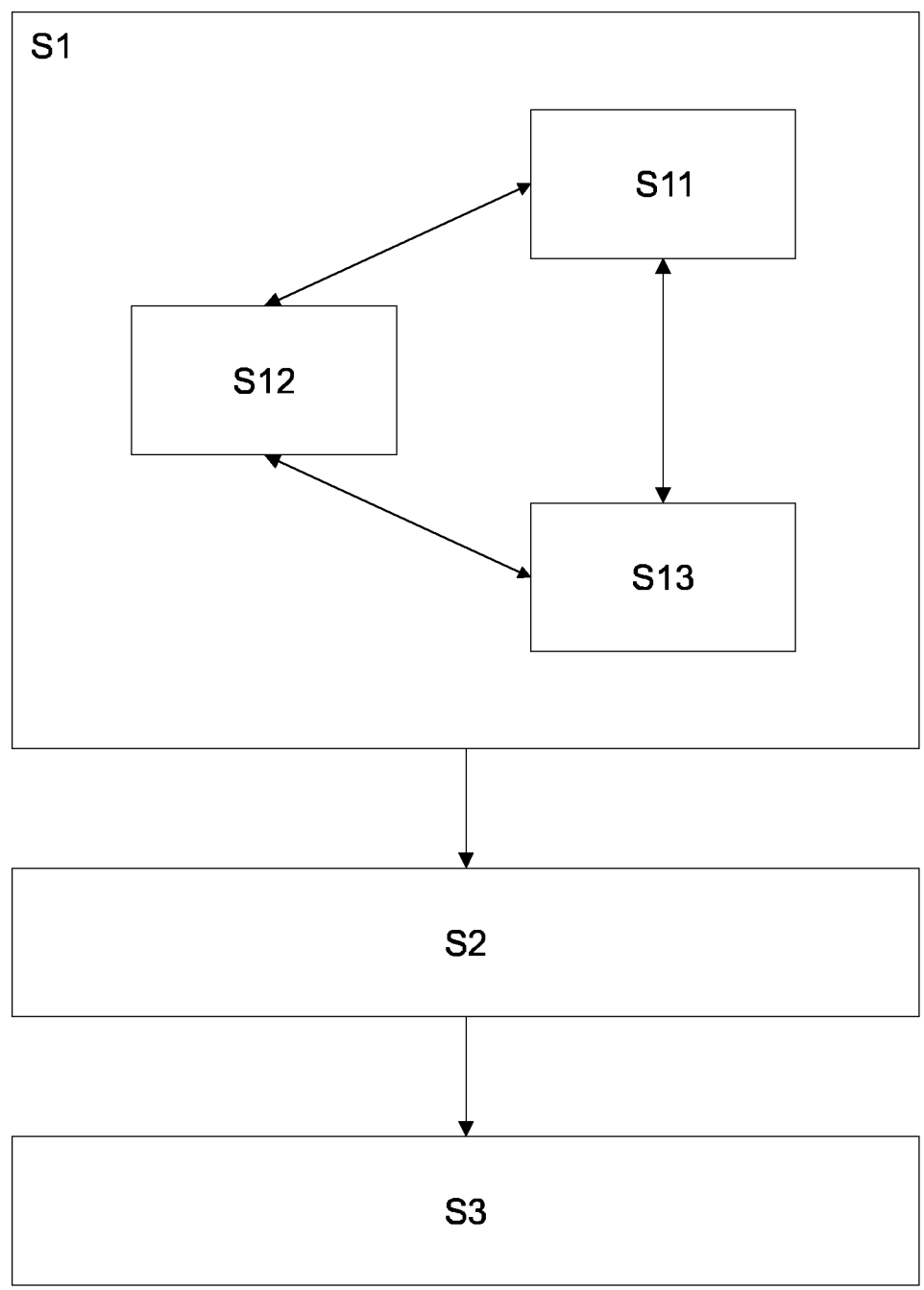
FIG. 3 is a schematic flow chart of an optimization and manufacturing method.

FIG. 3 shows, in a schematic manner, a low chart of an optimization and manufacturing method. On a high level, the method comprises three steps S1 to S3 which are used to build an indicative device, such as a power transformer 20. In a first step S1, the shape of a support structure 10 is optimized. Step S1 may comprise a number of individual optimization steps S11 to S13, which influence each other.

For example, in a first optimization step S11, the mechanical properties of the support structure may be optimized to transfer and distribute a desired compression force from a holding structure to at least one winding. Alternatively or in addition, the mechanical optimization step S11 may also enforce that the support structure achieves a predefined mechanical stiffness.

According to a second optimization step S12, at least one of a number, diameter or pathway of at least one cooling channel 31 interconnecting a plurality of integrated orifices 14 and 15 may be optimized to provide a predefined thermal cooling capability. For example, the flow resistance of the support structure 10 with a given flow of coolant and may be computed and optimized.

In a third optimization step S13, a surface structure of the support structure 10 can be optimized to match at least one of a holding structure and/or the at least one winding. For example, a number of protrusions 29 and 30 may be formed in or on a first side 16 and/or a second side 17 of a disk shaped body 28 to safely transfer compression, bending and/or short-circuit forces, for example during transport, operation and a failure mode of a power transformer, from a holding structure to at least one winding 24 and/or to further guide and distribute a liquid coolant.

As indicated in FIG. 3 by the double sided arrows, the various optimization steps S11 to S13 may impact each other. Using modern design methods, the shape and structure of the support structure 10 may be varied until the required properties are achieved and desired optimization parameters have assumed a maximum or minimum value. For example, an overall thickness of the support structure 10 may be minimized while maintaining a required flow of a liquid coolant and a required electrical insulation as well as a required mechanical stiffness of the support structure 10.

Once the design of the support structure 10 has been optimized in step S1, the support structure 10 is manufactured in step S2 using a modern manufacturing method. In particular, the support structure 10 may be 3D printed using an appropriate additive manufacturing method such as large format additive manufacturing (LFAM), selective laser sintering (SLS) fused deposition modeling (FDM), or stereolithography (SLA).

In a further step S3, the support structure 10 may be integrated, for example as upper press plate 26 or lower press plate 27 into a power transformer 20 or similar inductive device, such as a reactor. For example, a lower press plate 27 may be placed over a core 25, before one or more windings 24 are arranged on a top surface of the lower press plate 27. Then, an upper press plate 26 may be placed over the core 25 and over the windings 25. At last, an upper yoke 21 may be mounted over the upper press plate 26 and may provide a compressional force via the upper press plate 26 to the windings 24.

Figure 4:
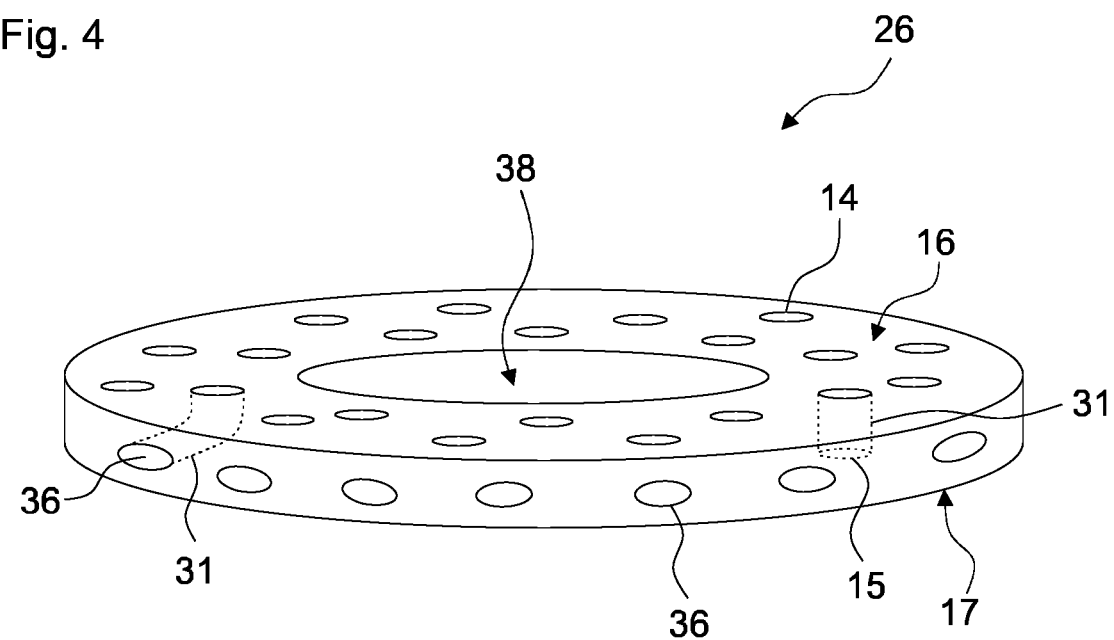
FIG. 4 is a schematic perspective view of a first press plate.
Figure 5:
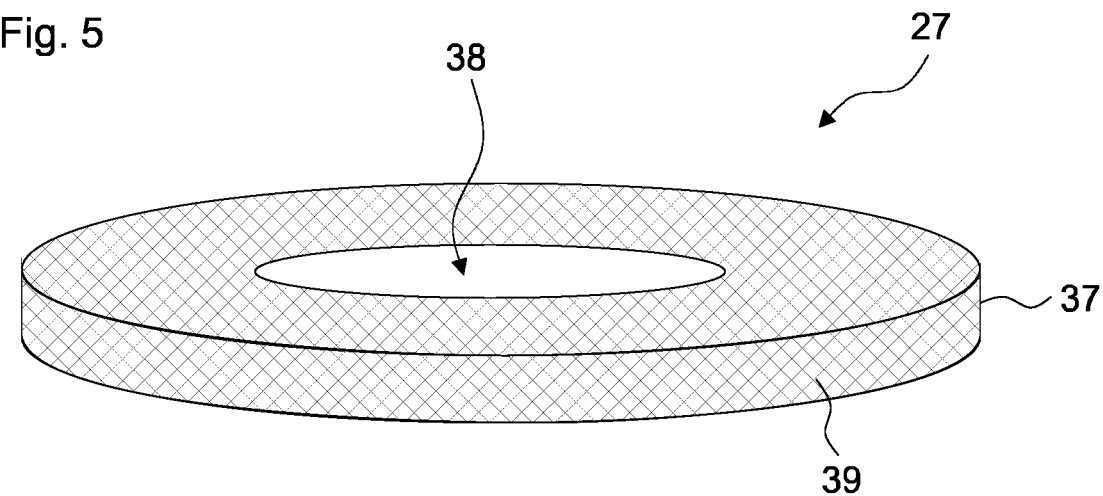
FIG. 5 is a schematic perspective view of a second press plate.

FIGS. 4 and 5 show a schematic perspective view of a first press, upper press plate 26 and a second, lower press plate 27, respectively. The upper press plate 26 comprises a number of first orifices 14 at a first side 16 of a disk shaped body 28 and also comprises a number of second orifices 15 at a second side 17 of the disk shaped body 28. It also comprises a number of third orifices 36 at a side surface 37 of the disk shaped body 28. The central part of the disk shaped body 28 comprises a relatively large opening 38, through which the core 25 of an inductive device can be passed. As shown in FIG. 4, the various orifices 14, 15 and 36 are connected by a number of cooling channels 31. At least some of the internal cooling channels 31 are curved and can therefore not be manufactured using conventional, subtractive manufacturing methods, such as drilling or pressing.

The lower press plate 27 of FIG. 5 also comprises a disk shaped body 28 with a central opening 38. Contrary to the discrete cooling channel 31 of the upper press plate 26 of FIG. 4, the entire disk shaped body 28 is formed from a truss structure 39, which permits a flow of a liquid coolant to pass through the lower press plate 27, while still providing adequate mechanical support and electrical insulation.

The embodiments shown in FIGS. 1 to 5 as stated represent exemplary embodiments of the improved support structure and method for its manufacture. Therefore, they do not constitute a complete list of all embodiments according to the improved devices and methods. Actual support structures, inductive devices and methods for their manufacturing may vary from the embodiments shown in terms of arrangements, shapes and materials.

REFERENCE SIGNS 1a low voltage winding
1b high voltage winding
1c regulation winding
2a top support structure
2b bottom support structure
3 press block
4 press supports
5 top press ring
6 spacers
7 top spacer ring
8 bottom spacer ring
9 bottom press ring
10 support structure
11 press structure
12 insulator structure
13 coolant flow structure
14 (first) orifice
15 (second) orifice
16 first side
17 second side
20 power transformer
21 upper yoke
22 lower yoke
23 transformer leg
24 winding
25 core
26 upper press plate
27 lower press plate
28 disk shaped body
29 first protrusion
30 second protrusion 31 cooling channel
32 upper cover
33 lower cover
34 strut
35 open cell
36 third orifices
37 side surface
38 opening
39 truss structure

The invention claimed is:

1. A support structure for one or more windings wound around a core of a transformer leg of a power transformer, comprising:
    a press structure configured to transfer and distribute a compression force from a yoke of the power transformer to the one or more windings;
    an insulator structure configured to electrically insulate the yoke from the one or more windings; and
    a coolant flow structure (13) configured to guide and distribute a flow of a liquid coolant to or from different parts of the one or more windings;
    wherein
    the press structure, the insulator structure and the coolant flow structure (13) are formed as one integrated part;
    the integrated part comprises a polymer material; and
    the coolant flow structure of the integrated part comprises a plurality of first orifices arranged at a first side of the support structure facing the yoke and a plurality of second orifices arranged at a second side of the support structure facing the one or more windings, and a plurality of protrusions formed on the first side and/or the second side, wherein the first and second orifices and the plurality of protrusions are configured to guide the flow of the liquid coolant from the first side to the second side.

2. The support structure of claim 1, wherein
    the polymer material has an intrinsic relative dielectric permittivity of less than 4.0; and/or
    the integrated part has an effective relative dielectric permittivity of less than 3.5 when all cooling channels of the coolant flow structure are filled with the liquid coolant.

3. The support structure of claim 1, wherein the integrated part is formed as an additive manufacturing part comprising an engineering plastic material or a photopolymer.

4. The support structure of claim 1, wherein the polymer material is chemically resistant to at least one of mineral oil, silicon oil, synthetic ester, or natural ester.

5. The support structure of claim 1, wherein the polymer material comprises at least one of polyetherimide (PEI), polyether ether ketone (PEEK), polyamide (PA), polyphenylene sulfide (PPS), polybutylene terephthalate (PBT), or polycyclohexylenedimethylene terephthalate (PCT).

6. The support structure of claim 1, wherein the polymer material comprises a composite material comprising fibers surrounded by a synthetic thermoplastic compound.

7. The support structure of claim 1, further comprising at least one curved cooling channel and/or at least one straight cooling channel, which crosses a disk shaped body of the support structure at an angle with respect to a longitudinal axis of the essentially cylindrical one or more windings, the at least one curved or straight cooling channel interconnecting at least one of the first orifices located at the first side with at least one of the second orifices located at the second side.

8. The support structure of claim 1, comprising: a flat body, in particular a square, a hexagonal, an octagonal or disk shaped body, having a first main surface facing the yoke and at least one opposite, second main surface facing the one or more windings;
    wherein
    the flat body and the at least one protrusion are formed as one integrated part; the at least one protrusion is arranged on at least one of the first main surface or the second main surface; and
    the flat body and the at least one protrusion comprise the press structure, the insulator structure and the coolant flow structure.

9. The support structure of claim 1, wherein the support structure is configured as a press plate and comprises at least one opening configured for receiving the core of the one or more windings.

10. A power transformer, comprising:
    a yoke;
    at least one transformer leg, each transformer leg comprising a core and one or more windings wound around the core; and
    at least one press plate arranged between the yoke (21, 22) and the one or more windings of the at least one transformer leg, wherein the at least one press plate comprises a support structure according to claim 1.

11. The power transformer of claim 10, further comprising a tank, wherein:
    the yoke, the at least one transformer leg and the at least one press plate are arranged within the tank; and
    the tank is at least partially filled with at least one of mineral oil, silicon oil, synthetic ester, or natural ester acting as a coolant for the power transformer.

12. The power transformer of claim 10, wherein the at least one press plate comprises
    an upper press plate arranged between an upper end of the one or more windings and an upper yoke of the power transformer and comprising the support structure according to claim 1; and
    a lower press plate arranged between a lower end of the one or more windings and a lower yoke of the power transformer.

13. The power transformer of claim 12, wherein the lower press plate comprises an upper cover and a lower cover, which are spaced apart by a number of struts together forming a cell or truss structure, such that the liquid coolant may enter or leave individual open cells of the cell or truss structure from below, above or the sides.

14. A method for manufacturing a support structure for one or more windings wound around a core of a transformer leg of a power transformer, the support structure comprising an integrated press structure, an integrated insulator structure, an integrated coolant flow structure, wherein the integrated coolant flow structure comprises a plurality of integrated first orifices arranged at a first side of the support structure facing a yoke of the power transformer, a plurality of integrated second orifices arranged at a second side facing the one or more windings, and a plurality of protrusions formed on the first side and/or the second side, wherein the first and second integrated orifices and the plurality of protrusions are configured to guide the flow of a liquid coolant from the first side to the second side of the support structure, the method comprising:
    forming (S2) the support structure from a polymer material using additive manufacturing.

15. The method of claim 14, wherein the additive manufacturing method comprises at least one of:
  fused deposition method (FDM);
  large format additive manufacturing (LFAM);
  selective laser sintering (SLS); or
  stereolithography (SLA).

\* \* \* \* \*